United States Patent [19]
Grassi et al.

[11] Patent Number: 5,668,974
[45] Date of Patent: Sep. 16, 1997

[54] MEMORY WITH VARIABLE LEVELS OF INTERLEAVING AND ASSOCIATED CONFIGURATOR CIRCUIT

[75] Inventors: Antonio Grassi, Como; Daniele Zanzottera, Milano, both of Italy

[73] Assignee: Bull HN Information Systems

[21] Appl. No.: 247,548

[22] Filed: May 23, 1994

[30] Foreign Application Priority Data

Jun. 16, 1993 [EP] European Pat. Off. .............. 93830263

[51] Int. Cl.$^6$ .............................. G06F 13/10; G06F 12/00
[52] U.S. Cl. ............................ 711/157; 395/872; 711/5; 711/115; 711/172
[58] Field of Search ........................... 395/442, 405, 395/872, 484, 497.03; 364/DIG. 1

[56] References Cited

U.S. PATENT DOCUMENTS

| | | | |
|---|---|---|---|
| 4,280,176 | 7/1981 | Tan ............................................. | 395/405 |
| 4,430,727 | 2/1984 | Moore et al. ............................... | 395/442 |
| 4,507,730 | 3/1985 | Johnson et al. ........................... | 395/497.01 |
| 4,783,736 | 11/1988 | Ziegler et al. ............................. | 395/457 |
| 4,788,656 | 11/1988 | Sternberger ............................... | 395/872 |
| 5,109,360 | 4/1992 | Inazumi et al. ............................ | 365/200 |
| 5,129,069 | 7/1992 | Helm et al. ................................ | 395/497.03 |
| 5,341,489 | 8/1994 | Heiberger et al. ........................ | 365/185.11 |

FOREIGN PATENT DOCUMENTS 0 332 911  9/1989  European Pat. Off. ..
0 473 275  3/1992  European Pat. Off. ..

OTHER PUBLICATIONS

IBM Technical Disclosure Bulletin, vol. 30, No. 11, Apr. 1988, New York, US; pp. 158–161 'Selectable Memory Card Interleave Scheme'.

Computer Design; vol. 15, No. 24, Nov. 1985, Winchester, US; pp. 93–100; J. Gustafson, et al. 'Memory-Mapped VLSI and Dynamic Interleave Improve Performance', p. 98, left column, line 1 –p. 100, left column, line 16.

Primary Examiner—Tod R. Swann
Assistant Examiner—J. Peikari
Attorney, Agent, or Firm—Ostrolenk, Faber, Gerb & Soffen, L.L.P.

[57] ABSTRACT

A memory having variable interleaving levels and associated configurator circuit which provides for the optimum level of interleaving based on the memory configuration. A number of independently addressable storage modules may be installed in the memory, the modules having various capacities which are usually multiples of a basic capacity. The configurator circuit receives a first field (ALOW) of least significant bits from the address for the desired memory entry and a second field (AHIGH) of bits of greater weight from the memory address. According to the number of the modules present in the memory and their capacities, the configurator circuit generates a module selection signal for selecting from the various modules present and a plurality of signals (MBIT) representing the memory module address bits. The configurator circuit thereby configures the memory with the highest levels of interleaving allowed by the capacity of the modules installed and properly addresses the selected module.

15 Claims, 6 Drawing Sheets

MEMORY WITH VARIABLE LEVELS OF INTERLEAVING AND ASSOCIATED CONFIGURATOR CIRCUIT

BACKGROUND OF THE INVENTION

This invention relates to a memory having variable levels of interleaving and a corresponding configurator circuit.

It is known that, in modem data processing systems, the working memory constitutes a "bottleneck" limitation to the system.

In fact, while various processors can operate with very short operation cycles on the order of tens of nsec, the working memories currently in use, which are of the DRAM type for cost reasons, are inherently slower, and the read/write time may be on the order of hundreds of nsec.

Each storage cycle requires a selection operation for the memory location to be read or written, and the selection operation becomes slower and more complex as the size or capacity of the memory increases.

DESCRIPTION OF THE PRIOR ART

So-called "interleaved" memories have long been proposed to obviate the limitation discussed above. These memories comprise a plurality of discrete and independently addressable storage modules.

Thus, several modules may be concurrently activated for read and/or write operations.

In practice, since data addressing and transfer operations are generally carried out through a single communication channel or bus shared by different processors and storage modules, the memory access operations do not take place quite simultaneously but rather in succession.

However, the read/write cycles overlap in time to a large extent.

The principle underlying interleaved memories is the local and sequential nature of data and instructions.

In general, when a process is carded out, and hence instructions are read or data is read/written, the information utilized is identified by successive addresses.

Thus, if successive addresses point to different storage modules, the access to the various modules may overlap in time.

For example, in the simplest instance of a two-way interleaved memory comprising two modules, the bit of least weight in an address, which alternately defines even and odd number addresses, may be used to select, according to its level, either of the modules, which are thus assigned to store even and odd address information, respectively.

Interleaving need not be limited to two storage modules, and the use of a number N of address bits of least weight allows $2^N$ storage modules to be selected in a simple, quick and repetitive manner.

As used herein, the "weight" of a bit refers conventionally to its order or placement in a series of bits such as a binary address, and bits of least weight in an address mean those bits of an address which identify the information unit which is read from or written to a memory by one read/write operation.

This unit or entry may comprise one or more bytes, and usually comprises a number of bytes equal to a power of 2.

In general, the information unit identified by an address is the byte.

Accordingly, the address bits which identify the byte within the information unit being read or written are used for addressing neither the memory nor its modules.

Memories of the interleaved kind can be easily implemented only when all the modules have the same capacity and are equal in number to a power of two.

The level or degree of interleaving depends on the number of the modules. When this number is 2, the interleaving level or degree is 2, when the number of modules is 4, the interleaving has a degree of 4, and so forth.

In systems in which the memory can be expanded and the number of the installed modules may be varied to meet the user's demands, and in view of foreseeable technological developments, the various memory modules may have different capacities which are generally multiples of a basic capacity. In such systems, module interleaving based on a module selection carried out with the bits of least weight is not feasible. Instead, the memory is arranged as a stack of modules, with each module being addressed by addresses of ever increasing weight. Module selection is then carried out using the bits of greatest address weight.

At most, the various modules are viewed as being composed of a plurality of blocks having basic capacities, and the various blocks are disposed in increasing address order such that, in the order, blocks belonging to different modules will follow one another.

This type of interleaving is called "high interleaving" to distinguish it from "proper interleaving" based on the bits of least weight, as described above, which is also referred to as "low interleaving" or simply "interleaving."

In this way, one can take advantage of the location of information for which data and instructions are generally identified by addresses pointing to different storage areas. In the event several processes are being run concurrently, the data and instruction areas used by the various processes are usually different, and are as a result allocated to different storage blocks.

In these structures, the addressing sequence criterion can apparently not be utilized.

Instead, memories comprising several modules are desirable which can provide for (low) interleaving structures irrespective of the number of modules and their capacity, and which can make the best use of the number of modules installed, even with variable storage configurations, to yield interleaving of the highest possible level and the largest possible storage capacity.

SUMMARY OF THE INVENTION

These results are obtained by the variable interleaving level memory and associated configurator circuit of the present invention. The present invention provides a memory consisting of any number of a plurality of independently addressable modules having different capacities that are multiples of a basic capacity, and a means associated with the memory of recognizing the number N of installed modules and their capacity C. Also associated with the memory is a configuration logic circuit which is set up using information about the number and capacity of the modules installed. The configuration logic circuit receives a predetermined number of bits of greatest and least weight of a memory address and responds by outputting a module selection code and an address bit selection code for selection of bits to be used to address locations within the module. The configuration logic circuit may even output some bits which are directly used to address locations within the module.

The configuration logic circuit preferably comprises a read/write memory of adequate capacity.

The configuration logic circuit is highly flexible in that it not only allows the highest degree of interleaving to be adopted for the actual configuration of the memory installed, but also provides the freedom to choose either of the high or low interleaving types in order to accommodate varying requirements of the processes being performed.

In fact, with some types of processes, high interleaving may prove to be more advantageous than low interleaving, although in most cases the contrary is true.

According to a further aspect of this invention, to minimize its storage capacity the configuration logic circuit comprises a plurality of registers, each of which is dedicated to a specific (low) level of interleaving from all the possible levels for the various memory configurations. Each register stores a selection code for an associated module at a given level of interleaving.

In this embodiment, only the most significant address bits are input to the read/write memory of the configuration logic circuit, and, based on the input bits, the logic circuit outputs a binary signal indicating the type of interleaving to be used and a code defining the module to be used (high interleaving) or the interleaving level (low interleaving), according to the interleaving type.

It also generates a second code representing the bits of greatest weight to be used for module addressing or, with equivalent results, a second control/modification code of the bits of greatest weight to be used for module addressing.

The code indicating the level of interleaving together with the bits of least weight provide for selection of one of the various registers so that the module selection code contained therein can be read and used to effect selection of the desired module.

According to a further aspect of this invention, the memory is made up of boards, each consisting of two mutually associated modules, and the registers provided for storing the module selection codes store a board or module pair selection code. The selection between the two associated modules on the board is effected by the address bit of least weight.

Thus, the number of the registers required can be reduced.

BRIEF DESCRIPTION OF THE DRAWINGS

The features and advantages of this invention will become apparent from the following description of a preferred embodiment thereof and the accompanying drawings, in which.

DESCRIPTION OF THE PREFERRED EMBODIMENTS

Figure 1:
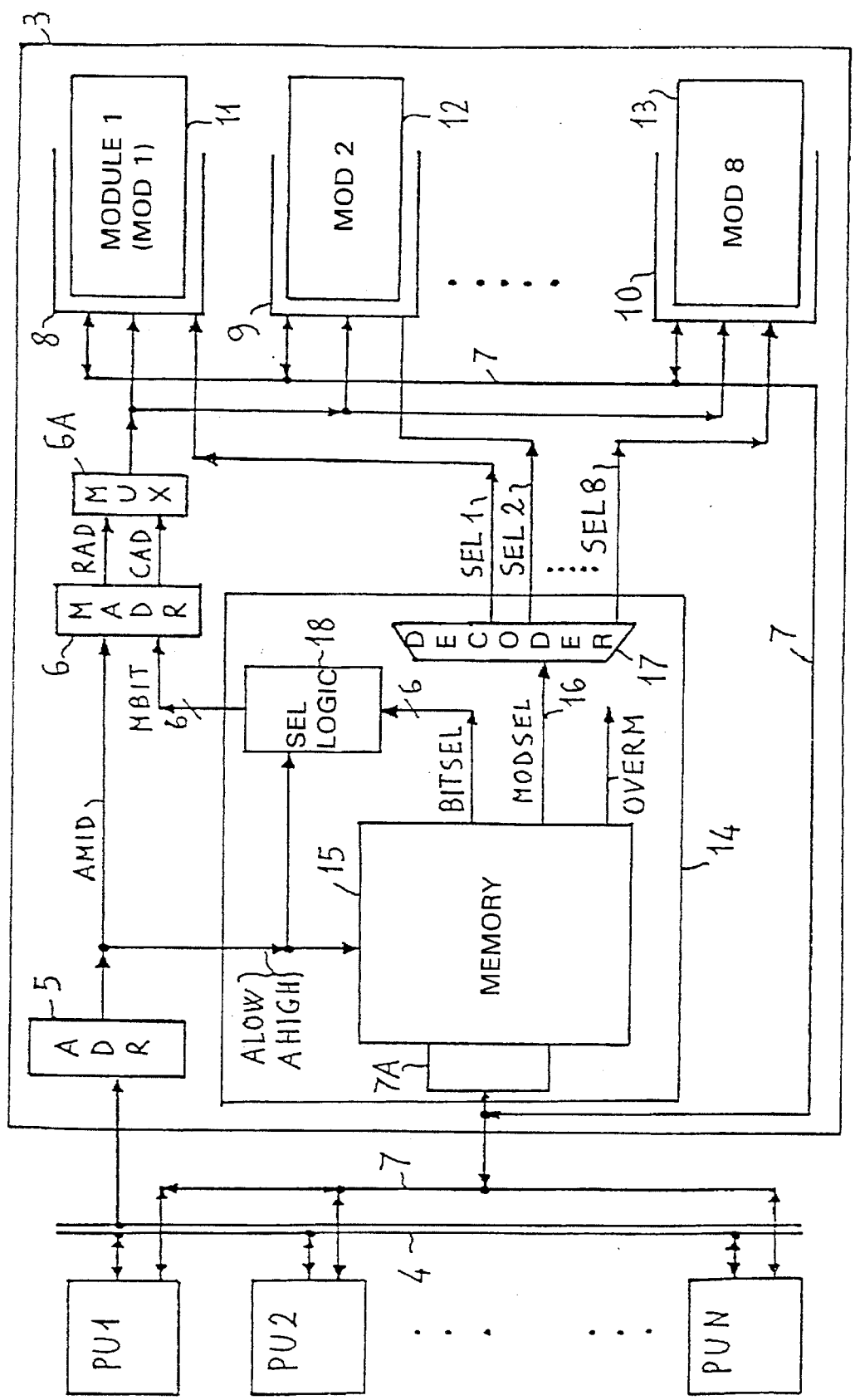
FIG. 1 is a block diagram showing a variable interleaving level memory of an embodiment of this invention.

With reference to FIG. 1, a data processing system, specifically a multiprocessor system, comprises a plurality of processing units PU1, PU2, PUN connected to a working memory 3 by a system bus 4 through which the various processors send addresses, data, and commands to the memory and receive information read from the memory.

The memory 3 comprises an input address latching register 5 (ADR), a module address latching register 6 (MADR), and a plurality of housings 8, 9, 10 for a corresponding plurality of memory cards or modules 11, 12, 13. In the example of FIG. 1, the system comprises 8 such memory card or modules, which are designated MOD1, MOD2, . . . MOD8, respectively.

The number of the modules actually installed in the corresponding housings depends on the user's demands.

For instance, a user may only initially require one memory module, and may later require the installation of one or more additional memory modules, each possibly with a higher capacity than that of the module initially installed.

The working memory 3 comprises a memory configuration unit 14 (hereinafter referred to as the configurator circuit or configurator) which selects and activates one of the various modules installed according to the address received and latched into the register 5 (ADR).

The problem of identifying the installed modules and their capacities has been solved by such prior art as European Patents EP-A-0080626 and EP-A-0108346, for example.

Alternatively, and as shown in the figure, the various modules are connected together and to the processors by a two-wire configuring and monitoring channel 7 of the I²CBUS type, which enables one of the processors to interrogate the various modules to check whether they are present, to determine their capacities and to set the configurator 14 accordingly, which is also connected to the channel 7 through the interface circuits 7A.

The I²CBUS (Inter-Integrated Circuit Bus) has been specifically defined for this kind of control function and is fully described, together with a plurality of interface and control components using this bus, in "Data Handbook 8051-based 8-bit Microcontroller", published by Philips in 1991.

The configurator 14 of this invention comprises essentially a first circuit 15 into which is input a first field of least significant address bits ALOW of orderly increasing weight and a second field of most significant bits AHIGH of orderly decreasing weight. The configurator 14 outputs, according to the bits received, a module selection code MODSEL and an address bit selection code BITSEL.

The code MODSEL is sent to a decoder 17 over a channel 16.

The decoder 17 outputs one of a plurality of selection signals SEL1, SEL2, . . . SEL8 for selecting the various modules.

The code BITSEL can be applied directly to the input of the register 6 as a replacement address field for the fields ALOW and AHIGH received by the circuit 15. Alternatively, as a preferred solution for reasons explained below, the code BITSEL can be applied to the input of a selection logic circuit 18 comprising essentially a decoder and multiplexers.

The selection logic circuit 18 is input the bit field ALOW and bit field AHIGH and, according to the code BITSEL, selects suitable address input bits and inputs them to the register 6 as module address bits (MBIT).

The register 6 also receives, directly from the register 5, a bit field AMID comprising the address bits not included with the other two fields.

Thus, the register 6 is loaded a module address MADR which selects a module location.

The module address in the register MADR can be split conventionally into a line or row address RAD and a column address CAD and applied to the various modules 11, 12, 13 at successive times through a multiplexer 6A using a distribution channel 6B.

Figure 2:
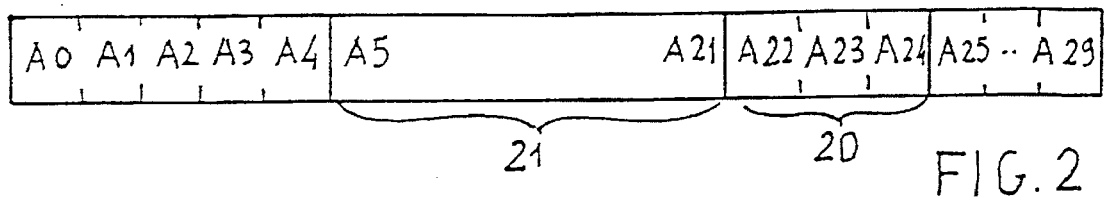
FIG. 2 shows a memory address format for the memory in FIG. 1.

FIG. 2 shows the structure or format of a storage address used in the system of FIG. 1, wherein the storage modules, varying in number between 1 and 8, are each assumed to have a capacity of either 32 Mbyte or 128 Mbyte, respectively.

In addition, the memory parallelism is assumed to be of 32 bytes.

The maximum storage capacity that can be installed, therefore, is 1 Gbyte, and an address formed of 30 bits A00 ... A29 is required to individually address each byte.

The five bits of least weight in the 30 bit address, A25:A29, are used to identify the byte addressed within the entry or addressable memory location; they are not used, therefore, in the memory addressing process which is carried out using just the bits A00 ... A24.

These bits allow 32 Mentry to be identified, although not all 32 Mentry need be present.

A module with a capacity of 32 Mbyte, that is 1 Mentry, requires 20 bits to select one entry.

A module with a capacity of 128 Mbyte, that is 4 Mentry, requires 22 bits to select one entry.

Hereinafter, the capacities of the memory and the modules will be expressed as the number of addressable entries, with the word "entry" dropped.

The bits A00 ... A24 should be variously used according to the number of the modules installed and their capacities, to provide the highest possible degree of interleaving.

Thus, the 3-bit field 20 A22 to A24 is used, in whole or in part, according to the number of the modules installed, to select one of the modules and provide interleaving based on the least significant bits.

However, when the bits A22 to A24 are used only in part (or not at all) in the module selection, the remaining portion of the field (or the whole field) must be used for addressing within the module and assisting in the formation of the module address.

The intermediate field 21 comprising the 17 address bits A (05:21) as a fixed component further assists in the formation of the module address.

The bits A02, A03, A04 replace the bits A22, A23, A24, respectively, as module address bits when the bits A22, A23, A24 are used in module selection to define a 2-, 4-, or 8-way low interleaving condition.

In this way, a 20-bit address can be readily formed which allows a module to be addressed if it has a capacity of 1M.

However, it should be kept in mind that the modules may have a capacity of 4M. In this case, to address the module, two additional bits should be used which, in a memory configured with no (low) interleaving, are the bits A03, A04 output from the register 5.

With a (low) interleaving memory, these two bits cannot be used without modifications for the following reasons:

1) If the memory block identified by the bits A00–A04 is interleaved, the bits A02, A03, and A04 have already been used as substitutes for the bits A22, A23, and A24, as explained above, and must be substituted in turn with more significant bits.

2) Even if the memory block identified by the bits A00–A04 is not interleaved, it can identify within a module a portion or block used to provide a low interleaving level, and the bits A03 and A04 should be modified to take this into account.

Thus, it is usually necessary to modify the bits A03, A04 by replacing them with bits A3M, A4M, selected according to the memory configuration and the interleaving levels adopted for the orderly preceding memory locations with respect to those identified by the bits A00–A04.

This selection and modification is carded out by the circuit 15 which, in the simplest of embodiments, comprises a read/write memory with associative table functions. The memory 15 associates, for every possible input address code consisting of the 8 bits A(0:4) and A(22:24), a module selection code (MODSEL), obviously a 3-bit one, and a code BITSEL representing module address bits to be loaded into the register 6.

When these bits are output from the memory 15, the code BITSEL must, of course, comprise 6 bits (A24M, A23M, A22M, A4M, A3M, and A2M).

The correlation between addresses input to the memory 15 and codes output from the memory 15 is established by writing such memory codes through the interface circuits 7A on the basis of the number of modules actually installed, their capacities, and the interleaving levels that can be obtained as a result.

With this approach, the memory 15 must apparently have a relatively large capacity and a high parallelism.

In the example, the memory 15 should have a capacity of $2^8=256$ entries and a parallelism of at least 9 bits.

The parallelism of the memory 15 further increases when the memory 15 is required to supply additional signals, such as a signal OVERM indicating recognition of a memory address in excess of the installed capacity.

Thus, the module addresses are best formed, rather than in a direct manner, through a selection logic circuit (18 in FIG. 1) which loads the appropriate bits into the register 6 according to the BITSEL code.

Figure 8:
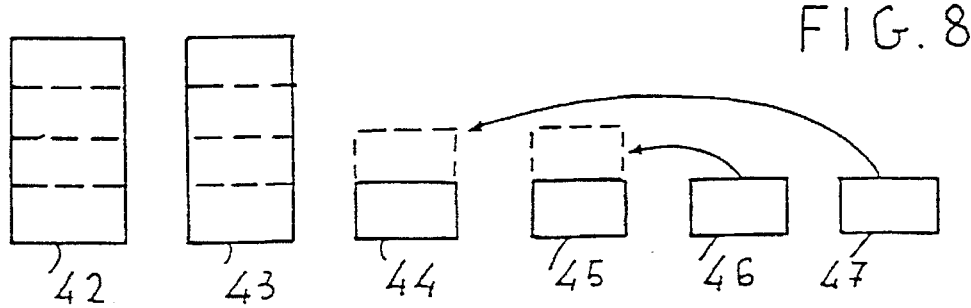

Since there are four possible interleaving situations in the example of FIG. 8, and two bits A03 and A04 requiring modification, a 4-bit code will be enough to control the logic circuit 18. The logic circuit 18 may comprise a decoder for generating (according to the input bits) the two modified bits A3M and A4M and the control signals for a set of three multiplexers which selectively transfer the bits A24, A04, A23, A03, A22, and A02.

In this way, the memory parallelism can be reduced.

Appropriate information, as suitably processed by one of the processors, is written into the memory 15 through the I²CBUS channel 7 and the interface circuits 7A which, in accordance with conventional practice, supply the memory 15 with a write address, a write command, and the information to be written, timed by the timing signal.

Before discussing in detail a preferred embodiment of the configurator 14 and variations thereof, FIGS. 3 to 9 should be considered which depict some of the memory situations that can be obtained and their corresponding interleaving levels.

The physical storage space may be viewed as a stack of orderly stacked addressable locations, divided into blocks and split between modules.

The addresses required to identify a location vary between 1 and a maximum of 32M, according to the number of the modules installed and their capacities.

Figure 3:
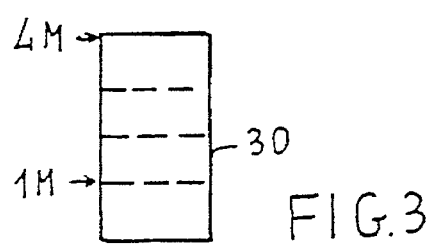
FIG. 3, FIG. 4, FIG. 5, FIG. 6, FIG. 7, FIG. 8 and FIG. 9 are diagrams showing some of the various possible configurations of a variable interleaving level memory which can be implemented in the memory of FIG. 1 according to the number of modules installed and their capacities.

FIG. 3 shows the physical storage space available where a single module 30 is installed.

Obviously, in this case, no interleaving would be allowed, and the bits A22–A24 would only contribute to the module address formation.

If the module capacity is 1M, then the bits A00–A04 must be at a logic 0 level.

If not, they would point to a storage entry which is not physically available, and, in that event, the configurator 14 may be set to provide an "overmemory" indication, in accordance with conventional techniques.

The function of the configurator 14 is basically to associate all the partial addresses received, irrespective of the logic level of the bits A22–A24, with the particular housing 8, 9, . . . 10 (FIG. 1) which has the module 30 therein, and to control the logic circuit 18 to transfer the bits A22–A24 through the logic circuit 18 and load them into the MADR register 6.

The case of a single module with a capacity of 4M is quite similar, with the only difference being that the bits A03 and A04 may have a logic level of 1 and are used to form the module address.

It can be observed at this point that to permit the modules to be installed in random order in the various viable housings, which involves the need for the configuration unit 14 to generate a housing selection code according to the housing where the module is installed, the logic circuit 18 control must be separated from the selection of the housing/module.

It is necessary, therefore, for the memory 15 to generate two discrete codes, one for controlling the logic circuit 18 and another for selecting the housing and associated module.

An embodiment which can overcome this limitation is discussed below.

Figure 4:
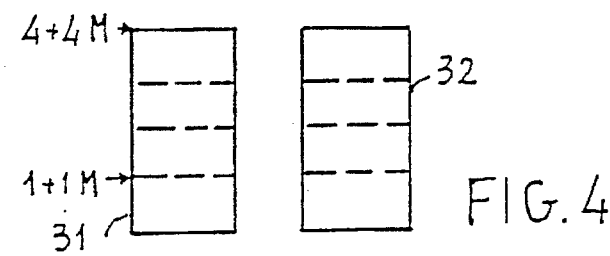

FIG. 4 shows the physical storage space which would be available in the instance of two memory modules 31, 32 being installed which have the same capacity of 1M or 4M.

In this case, the installed capacity would either be 1+1= 2M or 4+4=8M, and a two-way interleaved-type memory can be provided using the bit A24 of least weight to select either of the two modules.

According to the level of the input bit A24, the memory 15 will generate a selection code to select either of the modules and a control code to the logic 18 which will transfer the bits A22, A23 into the register 6, but not the address bit A24.

The bit A04 is transferred instead into the register 6.

Figure 5:
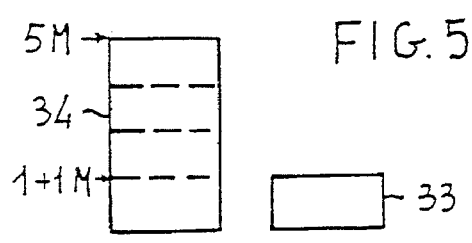

FIG. 5 illustrates the instance of a pair of modules being installed, one module 33 with a capacity of 1M and another module 34 with a capacity of 4M, which may be regarded as formed of four blocks each with a capacity of 1M.

Therefore, the capacity of the memory modules installed is 5M.

Here too a two-way interleaved memory can implemented by coupling a block from module 34 to module 33.

However, such interleaving can only be implemented for a capacity of 1+1M, namely for a set of addresses which are preferably but not necessarily within the 0 to 2M range.

The addresses within the 2M to 5M range correspond to a storage space which is accessible without interleaving.

The separation between the two spaces is defined by the bits A02, A03 of greatest weight which, when having a value of 1, identify an address higher than 2M and 4M, respectively.

Accordingly, the memory 15 will output, in response to the input bits A02, A03, a selection code which selects either of the two modules 33, 34 according to the logic level of the bit A24 if A02.A03=0.

Otherwise, (if A02=1 or A03=1) it selects the module 34.

In the former case, the bits A22 and A23, but not A24, would be loaded into the register 6 by the logic circuit 18. The bit A04 would be substituted for the bit A24.

In the latter case, the bits A22 . . . A24 would all be loaded into the register 6.

Figure 6:
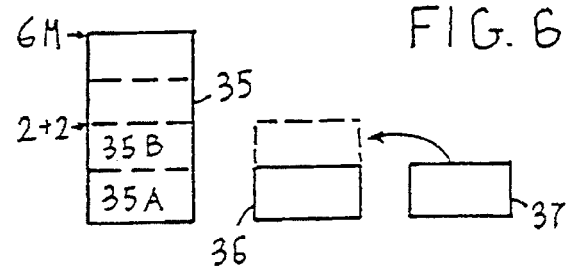

FIG. 6 illustrates the instance of three modules 35, 36, 37 being installed, of which one (35) has a capacity of 4M and the other two a capacity of 1M.

In this case a two-way interleaved memory can be implemented by coupling a first block 35A from module 35 to module 36 and a second block 35B from module 35 to module 37.

Thus, a two-way interleaving is provided with an overall capacity of 4M, with 2M of storage corresponding to the addresses of 4 to 6M being accessible without interleaving.

It can be seen that in this case the modules 35 and 36 should be associated with addresses in the 0 to 2M range, and the modules 35 and 37 with addresses in the 2 to 4M range.

Here again, the memory 15 will output, in response to the bits A02, A03 and A24, the selection signal for the appropriate module, it selecting in all events (independently of A24) the module 35 when A02=1. Again, if A02=0, the bit A04 is loaded into the register 6 to substitute for the bit A24.

Figure 7:
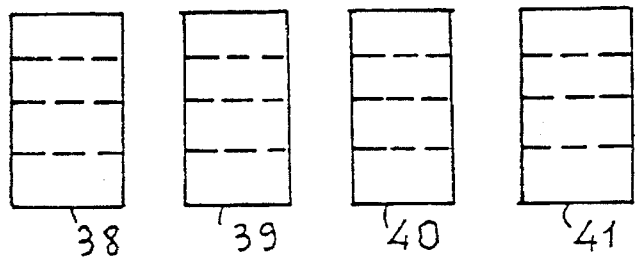

FIG. 7 illustrates the instance of four modules 38, 39, 40, 41 being installed having the same capacities of 1M or 4M or different capacities. In this case, with modules of similar capacity, a four-way or level interleaving can apparently be implemented using the bits A23, A24 to effect the selection of the various modules through the memory 15.

The bits A3, A4 are loaded into the register 6 instead of the bits A23, A24.

When the modules have different capacities, e.g. two modules 38, 39 have capacities of 4M each and two modules 40 and 41 have capacities of 1M each, a four-way interleaving can be provided for the storage space in the 0 to 4M range and a two-way interleaving can be provided for the storage space in the 4M to 10M range.

Similar considerations apply to the case in which three of the four modules in FIG. 7 have capacities of 4M each, when three blocks corresponding to capacity of 3M from one of the modules would not be interleaved, and to the case in which only one of the modules has a capacity of 4M, when a four-way interleaving can be implemented for the storage space in the 0 to 4M range.

FIG. 8 illustrates the instance of a 6-module installation, of which two modules 42, 43 have capacities of 4M each and the remaining modules 44, 45, 46, 47 have capacities of 1M each.

In this case, the modules 42, 43, 44, 45 allow a four-way interleaving to be provided for the storage space in the 0 to 4M range, the modules 42, 43, 46, 47 allow a further four-way interleaving to be provided for a further storage space in the 4 to 8M range, and the remaining modules 42, 43 allow a two-way interleaving to be provided for the remaining storage space in the 8to 12M range.

In light of these considerations, an examination of the other possible configurations with 5, 7, or 8 modules installed having the same or different capacities becomes a simple matter.

In general, with the different possible configurations of the memory installed, there may be associated a number of modules (or fraction thereof in the instance of modules with a capacity of 4M) such that the highest possible level of interleaving can be attained in the configuration, and the remaining modules (or fractions) may be used to attain a lower interleaving level, optionally leaving a single module or fraction thereof as a remainder to be selected as non-interleaved.

It is apparent that where circumstances make it advisable, the interleaving memory setup may be replaced, in whole or in part, through appropriate initialization of the memory 15, by a storage structure with high interleaving.

Figure 9:
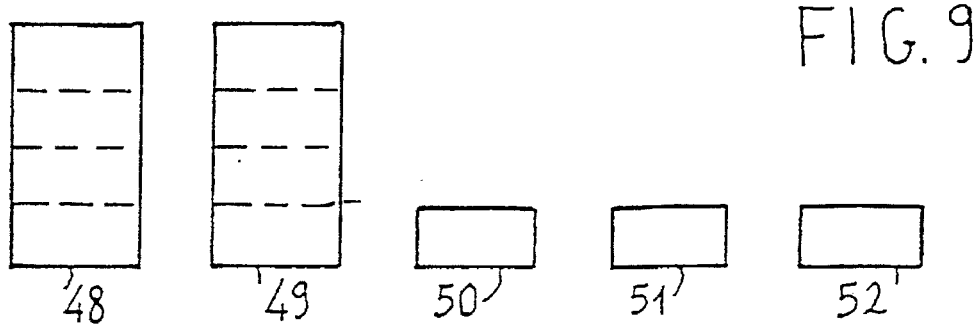

For example, FIG. 9 illustrates the instance of a memory with five modules 48, 49, 50, 51, 52 installed, of which the first two have capacities of 4M each and the rest have capacities of 1M each. The first two modules may be set up to provide a two-way (low) interleaving for a storage space in the 0 to 8M range, whereas the other three modules may form a storage space in the 8to 11M range with high interleaving.

These three modules only require for their selection that the most significant address bits be used.

In the example of FIG. 1, all these arrangements of storage spaces and addressed modules can be readily implemented by a memory 15 comprising a RAM into which is input the bits A00 ... A04 and the bits A22 ... A24. The RAM 15 has a capacity of $2^{5+3}=256$ entries.

The memory parallelism is designed to allow the storing of a 3-bit code for selecting one of the 8 modules and of at least one 4-bit code for controlling the selection logic 18.

According to a further aspect of this invention, the required storage capacity of the memory 15 for converting the address bits into a module selection code and a module address bit selection code may be reduced without introducing any restrictions to the range of choices available among possible interleaving levels and types. This is accomplished using a structure such as that shown in FIG. 10, where the functional criterion consists of indirectly selecting the memory modules by means of a first code which indirectly defines the interleaving type and level which have been associated with each address.

This code is used, along with the address bits of least significant weight A22 ... A24, to select, using a multiplexer network, one of various housing/module selection codes stored in a plurality of registers, each dedicated to a particular type and level of interleaving.

In this way, the circuit 15 can be implemented as a plurality of registers and multiplexers associated with a configuration memory which is only input the most significant bits A0 ... A04 and therefore has a greatly reduced capacity. Minimizing the storage capacity is advantageous for various reasons, including that the configurator can be more readily integrated into other circuits in order to form, for example, a memory control unit provided on a single integrated device (chip), and the time needed to write to and set up the configurator is minimized.

Figure 10:
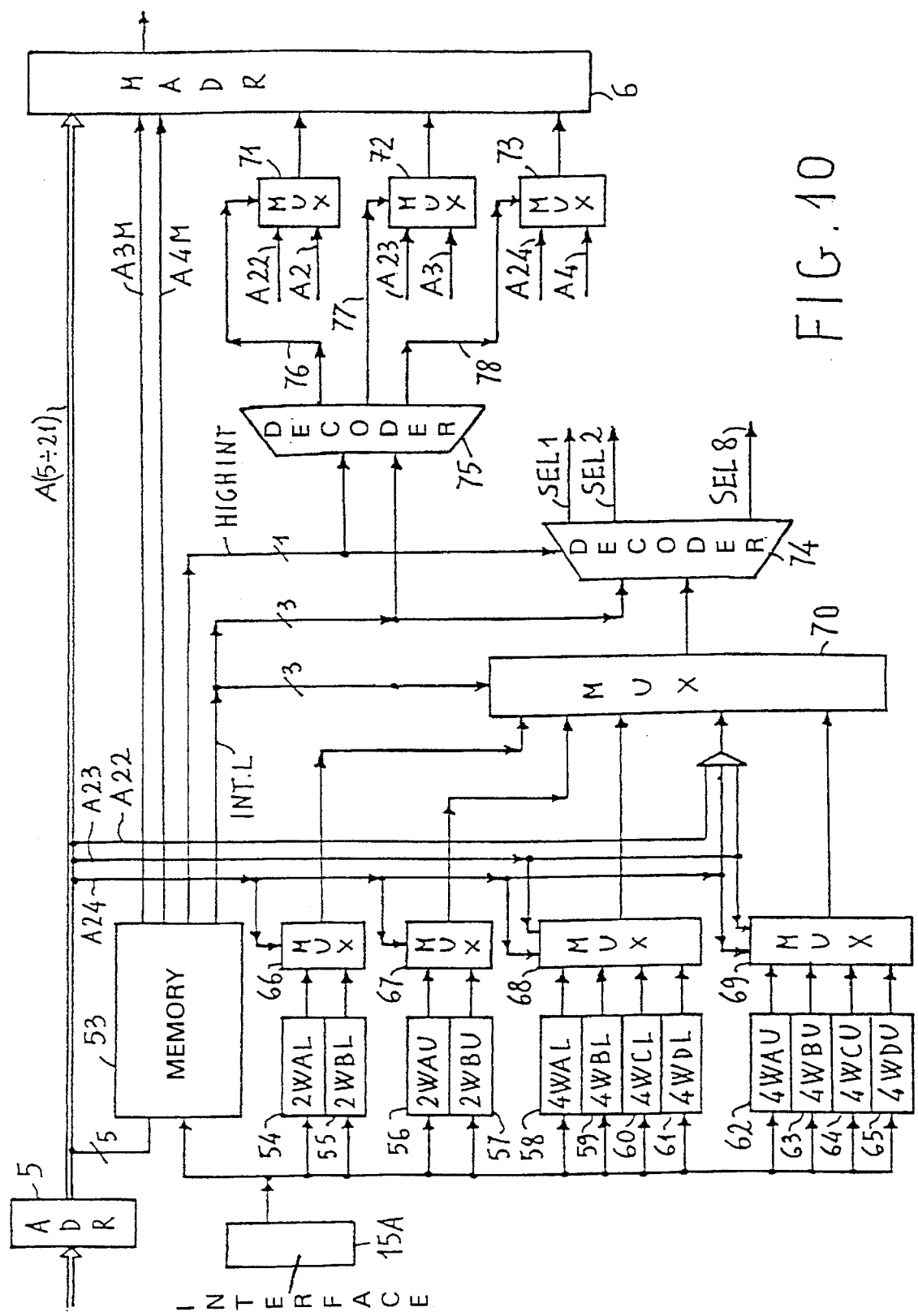
FIG. 10 shows a preferred embodiment of a configuration logic circuit for the memory shown in FIG. 1.

In FIG. 10, the configuration unit consists of a memory 53, a plurality of registers 54 to 65, a plurality of multiplexers 66 to 73, and a pair of decoders 74, 75.

The memory 53 and the registers 54 to 65 are loaded with appropriate codes by means of the interface circuit 15A and the I²CBUS bus, taking into account the number of the memory modules installed, their capacities, possible interleaving levels, and choices made by a supervisor program or an operator for adopting one or another of all the possible types of interleaving.

It is an easy matter to verify that in relation to the possible installation of any number of modules between one and eight with a capacity of either 1M or 4M each under any conditions, when the highest possible level of interleaving is selected, the memory configuration can be described by codes contained in the registers 54 to 65, each of which is dedicated to storing a module selection code characterized by a predetermined level of interleaving.

For any configuration of the memory installed, the largest number of modules present and associated to provide a two-way interleaving is four, arranged in sets of two.

Thus, the registers 54, 55 56, and 57 are each dedicated to storing a selection code to select one of these modules.

This 3-bit code, as respectively indicated at 2WAL, 2WBL, 2WAU, 2WBU, defines the housing which contains the identified module, which may then be located in any of the housings.

Similarly, for any configuration of the memory installed, the maximum number of modules present arranged to provide 4-way interleaving is eight associated in sets of four.

Thus, the registers 58 to 61 and 62 to 65 are respectively intended for storing a selection code for selecting one of these modules.

Here too the 3-bit codes define the housing which contains the identified module.

Finally, 8-way interleaving can only be implemented with all of the eight modules installed.

In this case, the module selection can be obtained by using the address bits of least weight A22, A23, A24 directly.

The outputs of the registers 54, 55 and 56, 57 are connected to the inputs of the multiplexers 66 and 67, respectively.

The outputs of the registers 58 to 61 and 62 to 65 are connected to the inputs of the multiplexers 68 and 69, respectively.

The multiplexers 66, 67 are controlled by the bit of least weight A24 and the multiplexers 68, 69 by the bit pair of least weight A23, A24.

The outputs of the multiplexers 66, 67, 68, 69 are connected to the inputs of the multiplexer 70, which also receives, on a fifth set of inputs, the three bits A22, A23, A24.

The multiplexer 70 is controlled by a 3-bit interleaving code INT.L output from the memory 53. The memory 53, being addressed only by the five most significant bits A (00:04) output from the register 5, and therefore having a capacity of just 32 entries, outputs in addition to the code INT.L a 1-bit interleaving signal HIGHINT which represents the storage space identified by the bits A (00:04) as characterized by high or low interleaving, and a pair of bits A3M, A4M loaded directly into the register 6 (MADR).

According to the logic level of the signal HIGHINT, the code INT.L has two meanings: for low interleaving, it defines the interleaving level (2, 4 or 8) and which of the two sets of registers is to be selected.

For high interleaving, it defines directly which module, or more precisely which housing, is to be selected.

The outputs of the multiplexer 70 are connected to the inputs of the decoder 74, into which is also input the code INT.L and signal HIGHINT.

According to the level of HIGHINT the decoder 74 decodes the code received by the multiplexer 70, or alternatively, the code INT.L into one of eight module selection signals SEL1 ... SEL8.

The signal HIGHINT and code INT.L are also input to the decoder 75, whose outputs 76, 77, 78 control the two-way multiplexers 71, 72, 73, respectively.

The address bits A22 and A02 are input into the multiplexer 71.

The address bits A23 and A03 are input into the multiplexer 72.

The address bits A24 and A04 are input into the multiplexer 73.

When the signal HIGHINT indicates that high interleaving is being used, the multiplexers 71, 72, 73 transfer the bits A22, A23, A24 to their outputs and load them into the register 6.

When HIGHINT indicates that low interleaving is being used (at a level defined by the code INT.L), the bits A24, A23, A22 are wholly or in part replaced with the bits A04, A03, A02 output from the multiplexers 71, 72, 73.

The register 6 also receives the bits A(5:21) from the register 5 to complete the module addressing code.

The number of the registers increases with that of the modules that can be installed in the memory, and hence with the number of the possible levels of interleaving. For example, the embodiment previously described as applied to a memory which may comprise 16 modules, with a capacity of 1M or 4M, would require a configuration storage capacity of 64 entries and 28 registers, with corresponding increased complexity of the multiplexing circuitry.

The register capacity should also be increased from three to four bits to identify one of 16 possible modules.

According to a further aspect of this invention, the number of the registers required is limited by the adoption of some restrictions on the possible number of modules that can be installed and their arrangement into interleaved structures.

Figure 11:
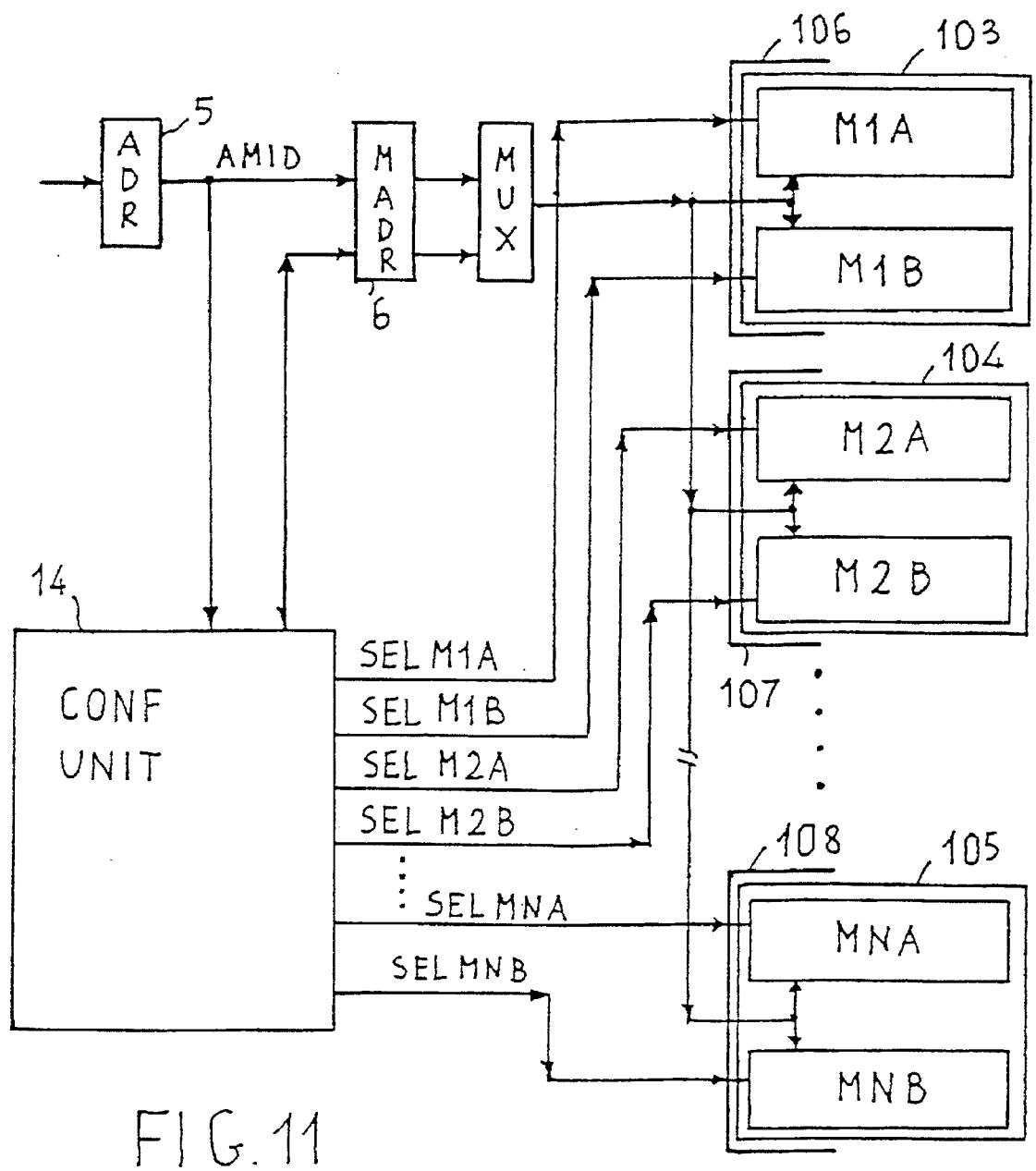
FIG. 11 depicts a memory wherein the modules are arranged in pairs, with each pair carried on a single board.

The restrictions consist essentially of providing, as shown in FIG. 11, a memory structure having boards 103, 104 . . . 105 each contained in a housing 106, 107, . . . 108, respectively, and comprising pairs of modules M1A/M1B, M2A/M2B . . . MNA/MNB, each of equal capacity with the modules being associable together into an interleaved pair.

Figure 12:
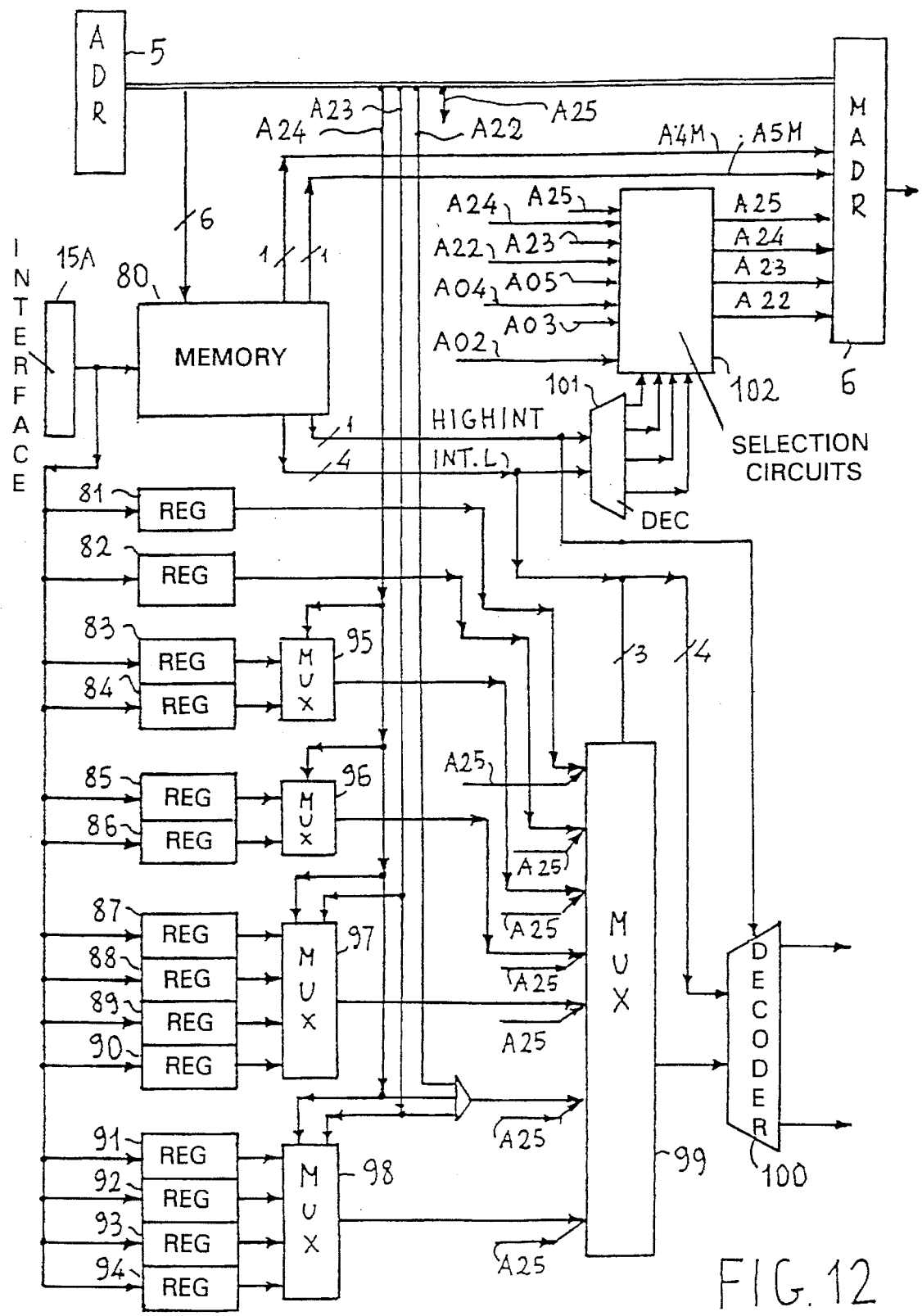
FIG. 12 shows a modified embodiment of the configurator circuit for a memory comprising paired modules.

With this limitation, the number of the registers required can be halved, as can the complexity of the multiplexing circuitry as shown in FIG. 12, which depicts a configuration unit for a memory comprising up to 16 modules with capacities of either 1M or 4M.

Apparently in this case, the memory address would comprise 26 bits and the highest possible level of interleaving would be 16.

The bits A0 to A5 identify a storage block of 1M within a space of 64M contained in one of the various modules, and the bits A25 to A22 allow one of the various modules to be selected in the instance of low interleaving.

In FIG. 12, the configuration unit comprises a memory 80, 14 registers 81–94, a plurality of multiplexers 95 to 99, two decoders 100, 101, and selection circuits (basically a set of multiplexers) 102.

The memory 80 is addressed by the bits A00 . . . A05 and outputs the bits A4M, A5M, a signal HIGHINT, and a 4-bit code INT.L having similar functions to those of the signals with corresponding names in FIG. 10.

The registers 81, 82 identify with 3 bits each a pair of modules belonging to the same board being associated in 2-way interleaving.

The two pairs of registers 83, 84 and 85, 86 identify with 3 bits each two pairs of modules belonging to two boards associated in four-way interleaving.

The sets of four registers 87 to 90 and 91 to 94 identify four pair each of modules associated in 8-way interleaving.

The outputs of the registers 83, 84, 85, and 86 are respectively connected to the inputs of the multiplexers 95, 96 controlled by the address bit A24.

The outputs of the registers 87 to 90 and 91 to 94, are respectively connected to the inputs of the multiplexers 97, 98 controlled by the address bits A23, A24.

The outputs of the registers 81, 82 and that of the multiplexers 95, 96, 97, 98 are connected to the inputs of the multiplexer 99 which also receives, on a set of inputs, the 4 address bits A25, A24, A23, A22 for selecting a module in the instance of 16-way interleaving.

With the 3-bit code received on the other inputs of the multiplexer, there is associated a fourth bit, consisting of bit A25, for selecting the module to be selected from the module pair identified by the 3-bit codes.

The remaining parts of the unit are identical to those considered in connection with FIG. 10.

According to the logic level of the signal HIGHINT, three bits of the code INT.L are used as a control code for the multiplexer 99, or all four bits of the code INT.L are used for the module selection code.

In addition, the signal HIGHINT and code INT.L are input to the decoder 101 and allow the selection circuits 102 to be controlled to load the appropriate bits into the register 6 according to the type of the interleaving and its level.

The bits A4M and A5M are supplied directly from the memory 80.

In the embodiment shown in FIG. 12, one or more boards may contain a single memory module.

This embodiment may occur, for instance, as a result of the initial installation of one or more boards with minimal capacity, consisting of a single module, or as a result of a failure damaging one module in a pair, which module must be excluded from the memory configuration.

In this case, the individual modules or the survivor module may be addressed in the same matter as non-interleaved modules, viewed as high-interleaved and selected when the signal HIGHINT is present.

Clearly the foregoing description relates to a preferred embodiment and variations thereof, and many other variations may be introduced.

For example, the bit A25 input to the multiplexer 99 of FIG. 11 may be input to the decoder 100.

Further, and again with reference to FIG. 11, if the added restriction is provided that all the modules installed except one are associated in pairs carried on the same board, the concept of choosing between two paired modules according to the value of the bit A25 may similarly be applied to high interleaved modules, effecting the selection by means of the address bit A05 input to the decoder 101.

By taking advantage of this feature, the memory 80 can be addressed by just the 5 most significant bits A0 . . . A04, and its capacity can be halved.

In this case, the code INT.L can be reduced to 3 bits, thus also reducing the memory parallelism.

To make the co-existence possible, in a modular memory of this type, of a board wherein only one module is active (as may occur as the result of a failure in either of the board modules and its exclusion), the surviving active module may be identified by the memory 80 through the code INT.L that characterizes it as non-interleaved by selecting a register, similar to the registers 81 to 94, which contains a module selection code.

Figure 13:
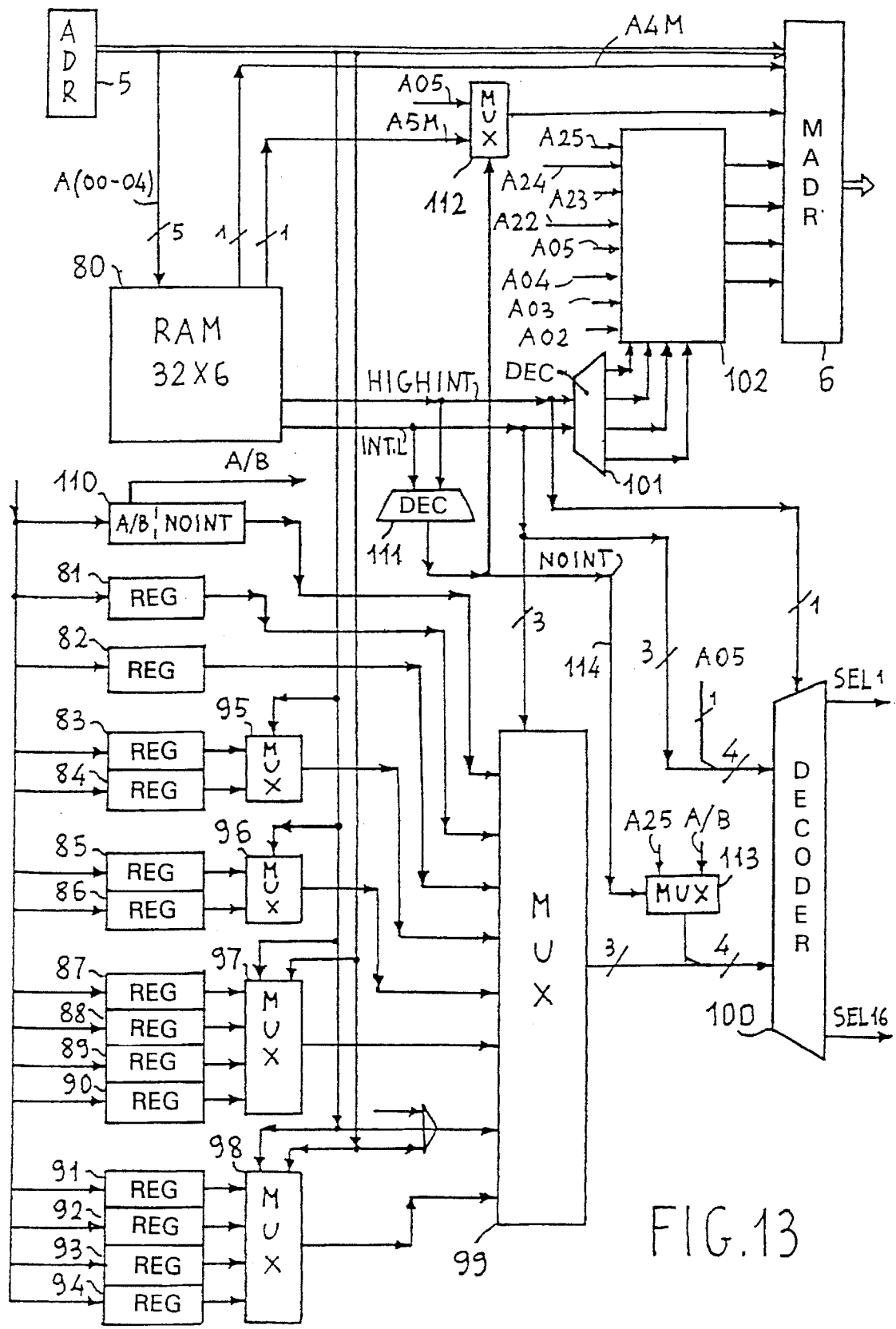
FIG. 13 shows a further modified embodiment of the configurator circuit for a memory comprising paired modules.

FIG. 13 shows this further version and only differs from the solution of FIG. 12 in these particulars.

Thus, the corresponding circuit elements in the two embodiments which perform the same functions are denoted by the same reference numerals.

In FIG. 13, the configuration unit includes as additional elements a four-cell register 110, a decoder 111, and two multiplexers 112, 113.

The register 110 is loaded with a three-bit code which identifies a board housing where a single module is active, while the fourth bit A/B identifies which of the two board modules is active.

The memory 80 with a capacity of 32 entries is only addressed by the most significant address bits A(00:04) and outputs the signal HIGHINT and code INT.L which comprises only three bits in this case.

The code INT.L controls the multiplexer 99 which, in this case, has eight sets of inputs and outputs the module pair code associated with the particular level of code associated with interleaving represented by the code INT.L.

In this case, the code INT.L would also represent a non-interleaved condition, to be used exclusively for the board on which just one module is active and to allow the code loaded into the register 110 to be selected and transferred.

The decoder 111, into which is input the code INT.L and signal HIGHINT, recognizes the non-interleaving code and asserts a signal NOINT on a wire 114 to control multiplexer 113.

The multiplexer 113 adds a fourth bit to the code being output from the multiplexer 99, the fourth bit comprising the bit A25 in the interleaving case or the bit A/B loaded into the register 110 in the non-interleaving case.

The four-bit code thus formed is input to the decoder 100, which is a controlled by the signal HIGHINT.

The decoder 100 is also input the code INT.L together with the bit A05 from the address channel.

Once the signal HIGHINT is present, this four-bit code is decoded into a module selection signal.

The memory 80 also outputs two signals A4M and A5M representing the modified bits to be input into the register MADR 6.

Alternatively, the signal A5M is input with the bit A05 being output from the register 5 into the multiplexer 112, which is controlled by the signal NOINT.

In fact, when the address recognized by the memory 80 identifies the non-interleaved module, the bit A05 should be used directly to form the module address.

We claim:

1. A configurator circuit for a memory having variable levels of interleaving, said memory comprising a plurality of independently addressable modules each having a capacity equal to either a basic capacity or a multiple of said basic capacity, wherein said memory is addressed by memory addresses each comprising at least a first field of lower order bits and a second field of higher order bits, and wherein said modules are each selectable by one of a plurality of module selection signals in accordance with an interleaving level dependent of the number and capacities of said modules, and said modules are addressed by module addresses comprising portions of said memory addresses, said configurator circuit comprising:

circuit means for receiving said first and second fields as inputs and outputting an address bit selection code and one of said module selection signals, said circuit means being configured with information related to the number of modules in said memory and their capacities; and selection means, coupled to said circuit means, for generating signals representing bits of said module addresses, said selection means being controlled by said address bit selection code and receiving as inputs as least a portion of said first field and at least a portion of said second field.

2. The configurator circuit of claim 1, wherein said circuit means comprises:

a memory device receiving said first and second fields as address inputs and outputting a module selection code and said address bit selection code; and a decoder coupled to said memory device to receive said module selection code and decode said module selection code into one of said plurality of module selection signals.

3. The configurator circuit of claim 2, wherein said memory device is a read/write memory, further comprising means for determining the number of modules and their capacities and for configuring said memory device based on said determination.

4. The configurator circuit of claim 1, wherein said first field comprises least significant bits in said memory addresses for addressing an entry within said memory and said second field comprises most significant bits in said memory addresses.

5. A configurator circuit for a memory having variable levels of interleaving, said memory comprising a plurality of independently addressable modules each having a capacity equal to either a basic capacity or a multiple of said basic capacity, wherein said memory is addressed by memory addresses each comprising at least a first field of lower order bits and a second field of higher order bits, and wherein said modules are each selectable by one of a plurality of module selection signals in accordance with an interleaving level dependent of the number and capacities of said modules, and said modules are addressed by module addresses comprising portions of said memory addresses, said configurator circuit comprising:

a memory device addressed by said second field to output an interleaving signal and an interleaving code, said interleaving code representing an interleaving level associated with said second field if said first signal is at first level and representing a module selection code if said first signal is at a second level;

a plurality of registers each storing a module selection code associated with one of a plurality of interleaving levels; and selection and decoding means, coupled to said plurality of registers and said memory device, for selecting one among said interleaving code and said module selection codes stored in said plurality of registers and for decoding said one selected code into one of said plurality of module selection signals, said selection and decoding means being controlled by at least a portion of said first field, said interleaving signal, and said interleaving code.

6. The configurator circuit of claim 5 further comprising circuit means, coupled to said memory device, for receiving at least a portion of said first field and at least a portion of said second field and outputting at least one signal representing a module address bit, said circuit means being controlled by said interleaving code and said interleaving signal.

7. The configurator circuit of claim 6 wherein said circuit means receives said first field and outputs a plurality of signals each representing a module address bit.

8. The configurator circuit of claim 6 wherein said circuit means comprises a decoder receiving said interleaving code and said interleaving signal as inputs, and at least one multiplexer coupled to the output of said decoder and receiving said at least a portion of said first field and said at least a portion of said second field as inputs, said at least one multiplexer selecting between said at least a portion of said first field and said at least a portion of said second field based on the output of said decoder.

9. The configurator circuit of claim 5 wherein said selection and decoding means comprises:

a multiplexer coupled to said memory device and said plurality of registers for selecting one among said module selection codes based on at least a portion of said first field and said interleaving code; and a decoder coupled to the output of said multiplexer for decoding said selected module selection code or said interleaving code into one of said plurality of module selection signals, said decoder being controlled by said interleaving signal.

10. The configurator circuit of claim 5 wherein said plurality of modules are arranged in a plurality of pairs of modules and said plurality of registers each store a selection code for a module pair associated with one of said plurality of interleaving levels, said configurator circuit further comprising first means for forming a module selection code by associating the least significant bit in said first field with said module pair selection code.

11. The configurator circuit of claim 10 wherein said interleaving code represents, for said second level of said interleaving signal, a selection code of a module pair, said configurator circuit further comprising second means for forming a module selection code by associating a lower order bit adjacent to said second field with said interleaving code.

12. The configurator circuit of claim 11 further comprising a register for storing a module selection code for selecting one module of a module pair having one active module only, said register inputting said module selection code to said selection and decoding means.

13. The configurator circuit of claim 5, wherein said memory device is a read/write memory and wherein said configurator circuit further comprises means for determining the number of modules and their capacities and for configuring said memory device based on said determination.

14. The configurator circuit of claim 5, wherein said first field comprises least significant bits in said memory addresses for addressing an entry within said memory and said second field comprises most significant bits in said memory addresses.

15. A variable interleaving level memory comprising:

a plurality of independently addressable memory modules at least two of which have different storage capacities; and a configurator circuit receiving portions of successive memory addresses addressing said memory and successively outputting module selection codes and bit selection codes for successive memory addresses, said module selection codes addressing at least some of said memory modules or parts thereof at a first interleaving level for first values of said memory address portions and addressing at least some of said memory modules or parts thereof at a second or no interleaving level for second values of said memory address portions; and a selection circuit coupled to said configurator circuit and receiving high and low order bits of said memory addresses for selecting based on said bit selection codes which of said high or low order bits to pass as module address bits for addressing locations within said modules.

* * * * *